US010368319B2

(12) United States Patent
Zhou et al.

(10) Patent No.: US 10,368,319 B2
(45) Date of Patent: Jul. 30, 2019

(54) METHOD AND APPARATUS FOR ADJUSTING TRANSMIT POWER IN GSM

(71) Applicant: Huawei Technologies Co., Ltd., Shenzhen, Guangdong (CN)

(72) Inventors: Kai Zhou, Shanghai (CN); Shengchang Shangguan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1 day.

(21) Appl. No.: 15/559,393

(22) PCT Filed: Mar. 19, 2015

(86) PCT No.: PCT/CN2015/074601
§ 371 (c)(1),
(2) Date: Sep. 18, 2017

(87) PCT Pub. No.: WO2016/145660
PCT Pub. Date: Sep. 22, 2016

(65) Prior Publication Data
US 2018/0077655 A1    Mar. 15, 2018

(51) Int. Cl.
*H04W 52/28* (2009.01)
*H04W 52/34* (2009.01)
(Continued)

(52) U.S. Cl.
CPC ..... *H04W 52/265* (2013.01); *H04W 52/0261* (2013.01); *H04W 52/146* (2013.01); *H04W 52/281* (2013.01); *H04W 52/34* (2013.01); *H04W 52/0258* (2013.01); *H04W 52/16* (2013.01); *H04W 52/346* (2013.01); *H04W 52/367* (2013.01); *H04W 88/06* (2013.01); *Y02D 70/10* (2018.01); *Y02D 70/12* (2018.01); *Y02D 70/122* (2018.01)

(58) Field of Classification Search
CPC ............. H04W 52/146; H04W 52/281; H04W 52/0261; H04W 52/367; H04W 88/06; H04W 52/346; H04W 52/16
See application file for complete search history.

(56) References Cited

U.S. PATENT DOCUMENTS

2008/0161070 A1    7/2008   Lee et al.
2009/0275355 A1    11/2009  Tan et al.
(Continued)

FOREIGN PATENT DOCUMENTS

| CN | 101227672 A | 7/2008 |
| CN | 101808396 A | 8/2010 |
| CN | 103493552 A | 1/2014 |

*Primary Examiner* — Dong-Chang Shiue

(57) ABSTRACT

A method and an apparatus for adjusting a transmit power in GSM. The method includes: determining that a communications terminal concurrently executes services respectively on a first SIM card and a second SIM card that are supported by the communications terminal, where the service executed on the first SIM card is a first service, and the service executed on the second SIM card is a second service, a modem corresponding to the first SIM card is a first modem, and a modem corresponding to the second SIM card is a second modem; and further, adjusting steady-state transmit powers of modems according to a service type of the first service and a service type of the second service.

18 Claims, 4 Drawing Sheets

(51) Int. Cl.
  *H04W 52/26* (2009.01)
  *H04W 52/02* (2009.01)
  *H04W 52/14* (2009.01)
  H04W 52/16 (2009.01)
  H04W 88/06 (2009.01)
  H04W 52/36 (2009.01)

(56) References Cited

U.S. PATENT DOCUMENTS

| | | |
|---|---|---|
| 2012/0117635 A1* | 5/2012 | Schell ............... G06F 21/34 726/9 |
| 2012/0270519 A1* | 10/2012 | Ngai ............... H04W 52/226 455/404.1 |
| 2013/0252663 A1 | 9/2013 | Shi et al. |
| 2013/0254579 A1 | 9/2013 | Derbyshire et al. |
| 2014/0080459 A1 | 3/2014 | Taha et al. |
| 2014/0155119 A1 | 6/2014 | Bishop et al. |

* cited by examiner

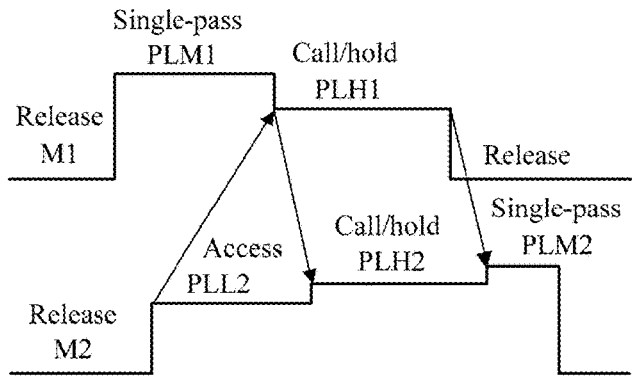

FIG. 1

```
Determine that a communications terminal concurrently executes services
respectively on a first subscriber identity module SIM card and a second SIM       ~ S201
card that are supported by the communications terminal
```

↓

```
Adjust steady-state transmit powers of modems according to a service type of a
first service and a service type of a second service, where the modems include a  ~ S202
first modem and a second modem
```

FIG. 2

```
Determine that a communications terminal concurrently executes services
respectively on a first subscriber identity module SIM card and a second SIM card  ~ S301
that are supported by the communications terminal
```

↓

```
Determine priorities of a first service and a second service according to a service
type of the first service and a service type of the second service                  ~ S302
```

↓

```
Adjust a steady-state transmit power of a modem corresponding to a high-priority
service in the first service and the second service to be greater than or equal to a
steady-state transmit power of a modem corresponding to a low-priority service in   ~ S303
the first service and the second service
```

FIG. 3

METHOD AND APPARATUS FOR ADJUSTING TRANSMIT POWER IN GSM

CROSS REFERENCE TO RELATED APPLICATIONS

This application is a National Stage of International Application No. PCT/CN2015/074601, filed on Mar. 19, 2015, which is hereby incorporated by reference in its entirety.

TECHNICAL FIELD

Embodiments of the present invention relates to communications technologies, and in particular, to a method and an apparatus for adjusting a transmit power in GSM.

BACKGROUND

With development of communications technologies, a Global System for Mobile Communications (Global System for Mobile Communication, GSM for short) dual card dual standby communications terminal comes into being. That is, the communications terminal can support two subscriber identity module (Subscriber Identity Module, SIM for short) cards, so that a user does not need to carry two communications terminals, and communication costs are greatly reduced. However, if two transmit timeslots of GSM overlap in the dual card dual standby communications terminal, a very large transient current may be caused, and time division duplexing (Time Division Duplexing, TDD for short) and board vibration in a dual Global System for Mobile Communications (Global System for Mobile Communication, GSM for short) project may have a risk of overrun indicators.

In the prior art, transmit powers of modems (Modem) corresponding to the two cards are separately limited, so as to avoid the risk of overrun indicators. FIG. 1 is a schematic diagram of transmit power limiting in the prior art. As shown in FIG. 1, a limiting method in the prior art specifically includes the following steps: 1) When a first demodulator (Modem1, M1 for short) performs communication by using a first maximum transmit power limit (PowerLmtMax1, PLM1 for short), a second demodulator (Modem2, M2 for short) performs access by using a second low-level transmit power limit (PowerLmtL2, PLL2 for short). 2) After the access of the M2 succeeds, a transmit power of the M1 is reduced to a first high-level transmit power limit (PowerLmtH1, PLH1 for short). 3) After the transmit power of the M1 is reduced to the PLH1, a transmit power of the M2 is increased to a second high-level transmit power limit (PowerLmtH2, PLH2 for short), so that the M1 and the M2 respectively use the PLH1 and the PLH2 to steadily limit the transmit powers. 4) After one of the modems is released, the other modem cancels the limiting and performs transmission by using a maximum transmit power. As shown in FIG. 1, if the M1 is released, the M2 performs communication by using a maximum transmit power limit second maximum transmit power limit (PowerLmtMax2, PLM2 for short).

As can be seen, in the prior art, when concurrent uplink transmission occurs, the M1 and the M2 steadily limit the transmit powers by respectively using the PLH1 and the PLH2, an equivalent total radiated power (Total Radiated Power, TRP for short) of the communications terminal is reduced, and a coverage area of a base station is reduced, resulting in degradation of communication quality of a service.

SUMMARY

Embodiments of the present invention provide a method and an apparatus for adjusting a transmit power in GSM, so as to ensure communication quality of a high-priority service.

According to a first aspect, an embodiment of the present invention provides a method for adjusting a transmit power in GSM, including:

determining that a communications terminal concurrently executes services respectively on a first subscriber identity module SIM card and a second SIM card that are supported by the communications terminal, where the service executed on the first SIM card is a first service, the service executed on the second SIM card is a second service, a modem corresponding to the first SIM card is a first modem, and a modem corresponding to the second SIM card is a second modem; and adjusting steady-state transmit powers of modems according to a service type of the first service and a service type of the second service, where the modems include the first modem and the second modem, so that a steady-state transmit power of a modem corresponding to a high-priority service in the first service and the second service is greater than or equal to a steady-state transmit power of a modem corresponding to a low-priority service in the first service and the second service, where the steady-state transmit power refers to a transmit power of a to-be-accessed service or a single-pass service within a period of time starting from successful access of the to-be-accessed service to the single-pass service to releasing of either of the services; and the to-be-accessed service is the first service or the second service, and correspondingly, the single-pass service is a service, other than the to-be-accessed service, in the first service and the second service.

With reference to the first aspect, in a first possible implementation manner of the first aspect, the adjusting steady-state transmit powers of modems according to a service type of the first service and a service type of the second service, where the modems include the first modem and the second modem, includes:

determining priorities of the first service and the second service according to the service type of the first service and the service type of the second service; and adjusting the steady-state transmit power of the modem corresponding to the high-priority service in the first service and the second service to be greater than or equal to the steady-state transmit power of the modem corresponding to the low-priority service in the first service and the second service.

With reference to the first possible implementation manner of the first aspect, in a second possible implementation manner of the first aspect, if the service types of the first service and the second service include a data service and a voice service, and the service types of the first service and the second service are different, the determining priorities of the first service and the second service according to the service type of the first service and the service type of the second service includes:

if the service type of the first service is a data service and the service type of the second service is a voice service, determining that the priority of the second service is higher than the priority of the first service; and correspondingly, the adjusting the steady-state transmit power of the modem corresponding to the high-priority service in the first service and the second service to be greater than or equal to the steady-state transmit power of the modem corresponding to the low-priority service in the first service and the second service includes:

adjusting the steady-state transmit power of the second modem to a second maximum transmit power limit PLM2 and adjusting the steady-state transmit power of the first modem to a first low-level transmit power limit PLL1; or the determining priorities of the first service and the second service according to the service type of the first service and the service type of the second service includes:

if the service type of the first service is a voice service and the service type of the second service is a data service, determining that the priority of the first service is higher than the priority of the second service; and correspondingly, the adjusting the steady-state transmit power of the modem corresponding to the high-priority service in the first service and the second service to be greater than or equal to the steady-state transmit power of the modem corresponding to the low-priority service in the first service and the second service includes:

adjusting the steady-state transmit power of the first modem to a first maximum transmit power limit PLM1 and adjusting the steady-state transmit power of the second modem to a second low-level transmit power limit PLL2.

With reference to the first possible implementation manner of the first aspect, in a third possible implementation manner of the first aspect, if the service types of the first service and the second service include a call service and a hold service, and the service types of the first service and the second service are different, the determining priorities of the first service and the second service according to the service type of the first service and the service type of the second service includes:

if the service type of the first service is a call service and the service type of the second service is a hold service, determining that the priority of the first service is higher than the priority of the second service; and correspondingly, the adjusting the steady-state transmit power of the modem corresponding to the high-priority service in the first service and the second service to be greater than or equal to the steady-state transmit power of the modem corresponding to the low-priority service in the first service and the second service includes:

adjusting the steady-state transmit power of the first modem to a first moderately-high-level transmit power limit PLHM1 and adjusting the steady-state transmit power of the second modem to a second moderately-low-level transmit power limit PLHL2; or the determining priorities of the first service and the second service according to the service type of the first service and the service type of the second service includes:

if the service type of the first service is a hold service and the service type of the second service is a call service, determining that the priority of the second service is higher than the priority of the first service; and correspondingly, the adjusting the steady-state transmit power of the modem corresponding to the high-priority service in the first service and the second service to be greater than or equal to the steady-state transmit power of the modem corresponding to the low-priority service in the first service and the second service includes:

adjusting the steady-state transmit power of the second modem to a second moderately-high-level transmit power limit PLHM2 and adjusting the steady-state transmit power of the first modem to a first moderately-low-level transmit power limit PLHL1.

With reference to the second possible implementation manner of the first aspect, in a fourth possible implementation manner of the first aspect, if the single-pass service is the first service, the first service is a data service, the to-be-accessed service is the second service, and the second service is a called voice service, before the adjusting the steady-state transmit power of the second modem to a second maximum transmit power limit PLM2 and adjusting the steady-state transmit power of the first modem to a first low-level transmit power limit PLL1, the method further includes:

configuring the first modem to use the first maximum transmit power limit PLM1 to execute the first service; and configuring the second modem to use the second low-level transmit power limit PLL2 to access the second service.

With reference to the second possible implementation manner of the first aspect, in a fifth possible implementation manner of the first aspect, if the single-pass service is the first service, the first service is a data service, the to-be-accessed service is the second service, and the second service is a calling voice service, before the adjusting the steady-state transmit power of the second modem to a second maximum transmit power limit PLM2 and adjusting the steady-state transmit power of the first modem to a first low-level transmit power limit PLL1, the method further includes:

configuring the first modem to use the first maximum transmit power limit PLM1 to execute the first service;

before the second modem initiates the calling voice service, reducing the transmit power of the first modem to the first low-level transmit power limit PLL1; and configuring the second modem to use the second maximum transmit power limit PLM2 to execute the calling voice service.

With reference to the second possible implementation manner of the first aspect, in a sixth possible implementation manner of the first aspect, if the single-pass service is the first service, the first service is a voice service, the to-be-accessed service is the second service, and the second service is a data service, before the adjusting the steady-state transmit power of the first modem to a first maximum transmit power limit PLM1 and adjusting the steady-state transmit power of the second modem to a second low-level transmit power limit PLL2, the method further includes:

configuring the first modem to use the first maximum transmit power limit PLM1 to execute the first service; and configuring the second modem to use the second low-level transmit power limit PLL2 to access the second service.

With reference to the third possible implementation manner of the first aspect, in a seventh possible implementation manner of the first aspect, if the single-pass service is the first service, the first service is a call service, the to-be-accessed service is the second service, and the second service is a hold service, before the adjusting the steady-state transmit power of the first modem to a first moderately-high-level transmit power limit PLHM1 and adjusting the steady-state transmit power of the second modem to a second moderately-low-level transmit power limit PLHL2, the method further includes:

configuring the first modem to use the first maximum transmit power limit PLM1 to execute the first service; and configuring the second modem to use the second low-level transmit power limit PLL2 to access the second service.

With reference to anyone of the first to the seventh possible implementation manners of the first aspect, in an eighth possible implementation manner of the first aspect, after the adjusting the steady-state transmit power of the modem corresponding to the high-priority service in the first service and the second service to be greater than or equal to the steady-state transmit power of the modem corresponding to the low-priority service in the first service and the second service, the method further includes:

if the first modem stops executing the first service, adjusting the steady-state transmit power of the second modem to the second maximum transmit power limit PLM2; or if the second modem stops executing the second service, adjusting the steady-state transmit power of the first modem to the first maximum transmit power limit PLM1.

With reference to any one of the first aspect or the first to the eighth possible implementation manners of the first aspect, in a ninth possible implementation manner of the first aspect, the method further includes:

detecting an electric quantity status of the communications terminal; and if determining that a remaining electric quantity of the communications terminal is less than a low electric quantity threshold, reducing each transmit power limit by a preset numerical value, where the transmit power limit includes at least one of the following: the first low-level transmit power limit PLL1, the first moderately-low-level transmit power limit PLHL1, the first moderately-high-level transmit power limit PLHM1, the first maximum transmit power limit PLM1, the second low-level transmit power limit PLL2, the second moderately-low-level transmit power limit PLHL2, the second moderately-high-level transmit power limit PLHM2, or the second maximum transmit power limit PLM2.

According to a second aspect, an embodiment of the present invention provides an apparatus for adjusting a transmit power in GSM, including:

a determining module, configured to determine that a communications terminal concurrently executes services respectively on a first subscriber identity module SIM card and a second SIM card that are supported by the communications terminal, where the service executed on the first SIM card is a first service, the service executed on the second SIM card is a second service, a modem corresponding to the first SIM card is a first modem, and a modem corresponding to the second SIM card is a second modem; and an adjustment module, configured to adjust steady-state transmit powers of modems according to a service type of the first service and a service type of the second service, where the modems include the first modem and the second modem, so that a steady-state transmit power of a modem corresponding to a high-priority service in the first service and the second service is greater than or equal to a steady-state transmit power of a modem corresponding to a low-priority service in the first service and the second service, where the steady-state transmit power refers to a transmit power of a to-be-accessed service or a single-pass service within a period of time starting from successful access of the to-be-accessed service to the single-pass service to releasing of either of the services; and the to-be-accessed service is the first service or the second service, and correspondingly, the single-pass service is a service, other than the to-be-accessed service, in the first service and the second service.

With reference to the second aspect, in a first possible implementation manner of the second aspect, the adjustment module includes:

a determining unit, configured to determine priorities of the first service and the second service according to the service type of the first service and the service type of the second service; and a first adjustment unit, configured to adjust the steady-state transmit power of the modem corresponding to the high-priority service in the first service and the second service to be greater than or equal to the steady-state transmit power of the modem corresponding to the low-priority service in the first service and the second service.

With reference to the first possible implementation manner of the second aspect, in a second possible implementation manner of the second aspect, if the service types of the first service and the second service include a data service and a voice service, and the service types of the first service and the second service are different, the determining unit is specifically configured to:

if the service type of the first service is a data service and the service type of the second service is a voice service, determine that the priority of the second service is higher than the priority of the first service; and correspondingly, the first adjustment unit is specifically configured to:

adjust the steady-state transmit power of the second modem to a second maximum transmit power limit PLM2 and adjust the steady-state transmit power of the first modem to a first low-level transmit power limit PLL1; or the determining unit is specifically configured to:

if the service type of the first service is a voice service and the service type of the second service is a data service, determine that the priority of the first service is higher than the priority of the second service; and correspondingly, the first adjustment unit is specifically configured to:

adjust the steady-state transmit power of the first modem to a first maximum transmit power limit PLM1 and adjust the steady-state transmit power of the second modem to a second low-level transmit power limit PLL2.

With reference to the first possible implementation manner of the second aspect, in a third possible implementation manner of the second aspect, if the service types of the first service and the second service include a call service and a hold service, and the service types of the first service and the second service are different, the determining unit is specifically configured to:

if the service type of the first service is a call service and the service type of the second service is a hold service, determine that the priority of the first service is higher than the priority of the second service; and correspondingly, the first adjustment unit is specifically configured to:

adjust the steady-state transmit power of the first modem to a first moderately-high-level transmit power limit PLHM1 and adjust the steady-state transmit power of the second modem to a second moderately-low-level transmit power limit PLHL2; or the determining unit is specifically configured to:

if the service type of the first service is a hold service and the service type of the second service is a call service, determine that the priority of the second service is higher than the priority of the first service; and correspondingly, the first adjustment unit is specifically configured to:

adjust the steady-state transmit power of the second modem to a second moderately-high-level transmit power limit PLHM2 and adjust the steady-state transmit power of the first modem to a first moderately-low-level transmit power limit PLHL1.

With reference to the second possible implementation manner of the second aspect, in a fourth possible implementation manner of the second aspect, if the single-pass service is the first service, and the first service is a data service, the to-be-accessed service is the second service, and the second service is a called voice service, the adjustment module further includes a first configuration unit, and the first configuration unit is configured to:

configure the first modem to use the first maximum transmit power limit PLM1 to execute the first service; and configure the second modem to use the second low-level transmit power limit PLL2 to access the second service.

With reference to the second possible implementation manner of the second aspect, in a fifth possible implementation manner of the second aspect, if the single-pass service is the first service, the first service is a data service, the to-be-accessed service is the second service, and the second service is a calling voice service, the adjustment module further includes a second configuration unit, and the second configuration unit is configured to:

configure the first modem to use the first maximum transmit power limit PLM1 to execute the first service;

before the second modem initiates the calling voice service, reduce the transmit power of the first modem to the first low-level transmit power limit PLL1; and configure the second modem to use the second maximum transmit power limit PLM2 to execute the calling voice service.

With reference to the second possible implementation manner of the second aspect, in a sixth possible implementation manner of the second aspect, if the single-pass service is the first service, the first service is a voice service, the to-be-accessed service is the second service, and the second service is a data service, the adjustment module further includes a third configuration unit, and the third configuration unit is configured to:

configure the first modem to use the first maximum transmit power limit PLM1 to execute the first service; and configure the second modem to use the second low-level transmit power limit PLL2 to access the second service.

With reference to the third possible implementation manner of the second aspect, in a seventh possible implementation manner of the second aspect, if the single-pass service is the first service, the first service is a call service, the to-be-accessed service is the second service, and the second service is a hold service, the adjustment module further includes a fourth configuration unit, and the fourth configuration unit is configured to:

configure the first modem to use the first maximum transmit power limit PLM1 to execute the first service; and configure the second modem to use the second low-level transmit power limit PLL2 to access the second service.

With reference to anyone of the first to the seventh possible implementation manners of the second aspect, in an eighth possible implementation manner of the second aspect, the adjustment module further includes a second adjustment unit, and the second adjustment unit is configured to:

if the first modem stops executing the first service, adjust the steady-state transmit power of the second modem to the second maximum transmit power limit PLM2; or if the second modem stops executing the second service, adjust the steady-state transmit power of the first modem to the first maximum transmit power limit PLM1.

With reference to any one of the second aspect or the first to the eighth possible implementation manners of the second aspect, in a ninth possible implementation manner of the second aspect, the apparatus further includes an electric quantity detection module, and the electric quantity detection module is configured to:

detect an electric quantity status of the communications terminal; and if determining that a remaining electric quantity of the communications terminal is less than a low electric quantity threshold, reduce each transmit power limit by a preset numerical value, where the transmit power limit includes at least one of the following: the first low-level transmit power limit PLL1, the first moderately-low-level transmit power limit PLHL1, the first moderately-high-level transmit power limit PLHM1, the first maximum transmit power limit PLM1, the second low-level transmit power limit PLL2, the second moderately-low-level transmit power limit PLHL2, the second moderately-high-level transmit power limit PLHM2, or the second maximum transmit power limit PLM2.

In the present invention, it is determined that a communications terminal concurrently executes services respectively on a first subscriber identity module SIM card and a second SIM card that are supported by the communications terminal, where the service executed on the first SIM card is a first service, the service executed on the second SIM card is a second service, a modem corresponding to the first SIM card is a first modem, and a modem corresponding to the second SIM card is a second modem; further, steady-state transmit powers of modems are adjusted according to a service type of the first service and a service type of the second service, where the modems include the first modem and the second modem, so that a steady-state transmit power of a modem corresponding to a high-priority service in the first service and the second service is greater than or equal to a steady-state transmit power of a modem corresponding to a low-priority service in the first service and the second service. Therefore, communication quality of a high-priority service is ensured.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 1 is a schematic diagram of transmit power limiting in the prior art;

FIG. 2 is a schematic flowchart of Embodiment 1 of a method for adjusting a transmit power in GSM according to the present invention;

FIG. 3 is a schematic flowchart of Embodiment 2 of a method for adjusting a transmit power in GSM according to the present invention;

DETAILED DESCRIPTION

Figure 4A:
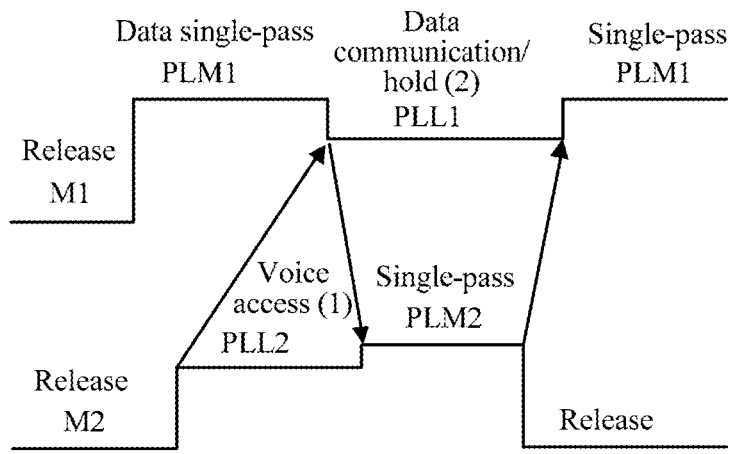
FIG. 4A is a schematic diagram 1 of power adjustment according to an embodiment of the present invention.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

As shown in FIG. 1, the power limiting solution in the prior art is not scenario-specific, and as long as concurrent uplink transmission occurs, the transmit powers of the M1 and the M2 are limited. For example, the M1 and the M2 respectively use the first high-level transmit power limit PLH1 and the second high-level transmit power limit PLH2 to steadily limit the transmit powers. There may be a problem that apart for which power limiting should be relaxed is also limited. Consequently, the TRP of the communications terminal is reduced, and a coverage area of a base station is reduced. In the embodiments of the present invention, use of different power limiting solutions according to different scenarios is proposed. For example, 1) a data service and a voice service are distinguished, and during concurrent execution of the two services, the voice service is preferentially ensured; 2) a call service and a hold service are distinguished, and during concurrent execution of the two services, the call service is preferentially ensured; 3) if it is determined that a remaining electric quantity of the communications terminal is less than a low electric quantity threshold, a stricter power limiting condition is used, so as to ensure communication quality of a high-priority service.

FIG. 2 is a schematic flowchart of Embodiment 1 of a method for adjusting a transmit power in GSM according to the present invention. This embodiment may be executed by an apparatus for adjusting a transmit power that is configured in a central processing unit (Central Processing Unit, CPU for short), and the apparatus may be implemented by means of software and/or hardware. The solution of this embodiment may be applied to a dual card dual standby communications terminal and can ensure communication quality of a high-priority service. As shown in FIG. 2, the method of this embodiment may include the following steps.

S201: Determine that a communications terminal concurrently executes services respectively on a first subscriber identity module SIM card and a second SIM card that are supported by the communications terminal.

In this embodiment of the present invention, it is determined that a communications terminal concurrently executes services respectively on two subscriber identity module SIM cards supported by the communications terminal (that is, concurrent uplink transmission occurs). The two subscriber identity module SIM cards are respectively a first SIM card and a second SIM card. The service executed on the first SIM card is a first service. The service executed on the second SIM card is a second service. A modem corresponding to the first SIM card is a first modem M1, that is, the first service is executed on the first SIM by using the M1. A modem corresponding to the second SIM card is a second modem M2, that is, the second service is executed on the second SIM card by using the M2.

S202. Adjust steady-state transmit powers of modems according to a service type of the first service and a service type of the second service, where the modems include the first modem and the second modem.

The steady-state transmit power refers to a transmit power of a to-be-accessed service or a single-pass service within a period of time starting from successful access of the to-be-accessed service to the single-pass service to releasing of either of the services; and the to-be-accessed service is the first service or the second service, and correspondingly, the single-pass service is a service, other than the to-be-accessed service, in the first service and the second service.

In this embodiment of the present invention, optionally, the service types of the first service and the second service include a data service and a voice service, and the service types of the first service and the second service are different; or the service types of the first service and the second service include a call service and a hold service, and the service types of the first service and the second service are different. A priority of the voice service is higher than a priority of the data service. A priority of the call service is higher than a priority of the hold service. The voice service includes a calling voice service and a called voice service.

In an implementation of the present invention, combinations of the service types of the first service and the second service are classified into two categories: 1) For a first category, the service types of the first service and the second service include a data service and a voice service, and the service types of the first service and the second service are different (that is, a case of concurrent execution of a data service and a voice service). 2) For a second category, the service types of the first service and the second service include a call service and a hold service, and the service types of the first service and the second service are different (that is, when the first service and the second service are both voice services, types of the voice services further include a call service and a hold service; that is, at a particular moment, when the first service is a call service, the second service is a hold service, or at a particular moment, when the second service is a call service, the first service is a hold service). Optionally, in this embodiment of the present invention, it is defined that a priority of the voice service is higher than a priority of the data service, and a priority of the call service is higher than a priority of the hold service. In this way, steady-state transmit powers of modems are adjusted according to the service type of the first service and the service type of the second service, where the modems include the first modem and the second modem (that is, using different power limiting solutions by distinguishing the service types of the first service and the second service), so that a steady-state transmit power of a modem corresponding to a high-priority service in the first service and the second service is greater than or equal to a steady-state transmit power of a modem corresponding to a low-priority service in the first service and the second service. Therefore, communication quality of a high-priority service is ensured. The steady-state transmit power refers to a transmit power of a to-be-accessed service or a single-pass service within a period of time starting from successful access of the to-beaccessed service to the single-pass service to releasing of either of the services. When the to-be-accessed service is the first service, the single-pass service is the second service; or when the to-be-accessed service is the second service, the single-pass service is the first service. Optionally, the voice service includes a calling voice service and a called voice service.

Optionally, step S202 includes:

determining priorities of the first service and the second service according to the service type of the first service and the service type of the second service; and adjusting the steady-state transmit power of the modem corresponding to the high-priority service in the first service and the second service to be greater than or equal to the steady-state transmit power of the modem corresponding to the low-priority service in the first service and the second service.

In this embodiment of the present invention, to use different power limiting solutions according to different scenarios, priorities of services are predefined (where a priority of a voice service is higher than a priority of a data service, and a priority of a call service is higher than a priority of a hold service). Priorities of the first service and the second service are determined according to the service type of the first service and the service type of the second. The steady-state transmit power of the modem corresponding to the high-priority service in the first service and the second service is adjusted to be greater than or equal to the steady-state transmit power of the modem corresponding to the low-priority service in the first service and the second service. For example, if the first service is a voice service and the second service is a data service, the steady-state transmit power of the first modem is adjusted to be greater than or equal to the steady-state transmit power of the second modem. For example, the steady-state transmit power of the first modem is adjusted to a first maximum transmit power limit PLM1, and the steady-state transmit power of the second modem is adjusted to a second low-level transmit power limit PLL2, where the PLM1 is greater than or equal to the PLL2. Alternatively, if the first service is a call service and the second service is a hold service, the steady-state transmit power of the first modem is adjusted to be greater than or equal to the steady-state transmit power of the second modem. For example, the steady-state transmit power of the first modem is adjusted to a first moderately-high-level transmit power limit (PowerLmtHM1, PLHM1 for short), and the steady-state transmit power of the second modem is adjusted to a second moderately-low-level transmit power limit (PowerLmtHL2, PLHL2 for short). The PLHM1 is greater than the PLHL2.

Optionally, at each moment, a sum of the transmit power of the first modem and the transmit power of the second modem is less than or equal to a preset power threshold.

In this embodiment of the present invention, it is determined that a communications terminal concurrently executes services respectively on a first subscriber identity module SIM card and a second SIM card that are supported by the communications terminal, where the service executed on the first SIM card is a first service, the service executed on the second SIM card is a second service, a modem corresponding to the first SIM card is a first modem, and a modem corresponding to the second SIM card is a second modem; further, steady-state transmit powers of modems are adjusted according to a service type of the first service and a service type of the second service, where the modems include the first modem and the second modem, so that a steady-state transmit power of a modem corresponding to a high-priority service in the first service and the second service is greater than or equal to a steady-state transmit power of a modem corresponding to a low-priority service in the first service and the second service. Therefore, communication quality of a high-priority service is ensured.

Optionally, after the adjusting the steady-state transmit power of the modem corresponding to the high-priority service in the first service and the second service to be greater than or equal to the steady-state transmit power of the modem corresponding to the low-priority service in the first service and the second service, the method further includes:

if the first modem stops executing the first service, adjusting the steady-state transmit power of the second modem to the second maximum transmit power limit PLM2; or if the second modem stops executing the second service, adjusting the steady-state transmit power of the first modem to the first maximum transmit power limit PLM1.

FIG. 3 is a schematic flowchart of Embodiment 2 of a method for adjusting a transmit power in GSM according to the present invention. Based on the foregoing embodiment, as shown in FIG. 3, the method of this embodiment may include:

S301: Determine that a communications terminal concurrently executes services respectively on a first subscriber identity module SIM card and a second SIM card that are supported by the communications terminal.

S302: Determine priorities of the first service and the second service according to a service type of the first service and a service type of the second service.

S303: Adjust a steady-state transmit power of a modem corresponding to a high-priority service in the first service and the second service to be greater than or equal to a steady-state transmit power of a modem corresponding to a low-priority service in the first service and the second service.

In this embodiment of the present invention, to use different power limiting solutions according to different scenarios, priorities of services are predefined (where a priority of a voice service is higher than a priority of a data service, and a priority of a call service is higher than a priority of a hold service).

Figure 4B:
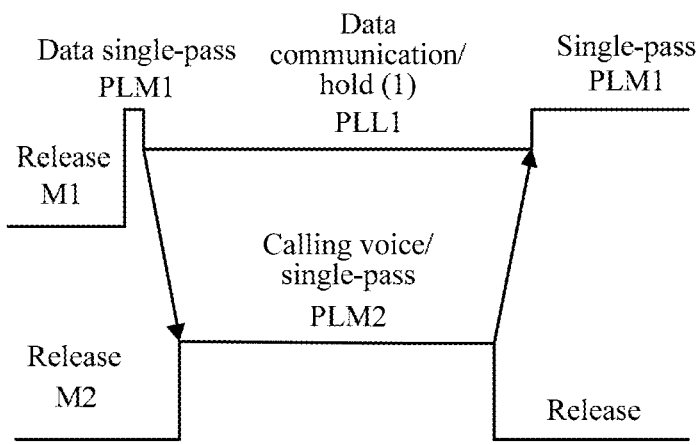
FIG. 4B is a schematic diagram 2 of power adjustment according to an embodiment of the present invention.

FIG. 4A is a schematic diagram 1 of power adjustment according to an embodiment of the present invention, and FIG. 4B is a schematic diagram 2 of power adjustment according to an embodiment of the present invention. As shown in FIG. 4A and FIG. 4B, if the service types of the first service and the second service include a data service and a voice service, and the service types of the first service and the second service are different (that is, in a case of concurrent execution of a data service and a voice service), step S302 includes: if the service type of the first service is a data service and the service type of the second service is a voice service, determining that the priority of the second service is higher than the priority of the first service. Correspondingly, step S303 includes: adjusting the steady-state transmit power of the second modem to a second maximum transmit power limit PLM2 and adjusting the steady-state transmit power of the first modem to a first low-level transmit power limit PLL1, where the PLM2 is greater than or equal to the PLL1.

Optionally, as shown in FIG. 4A, if the single-pass service is the first service, the first service is a data service, the to-be-accessed service is the second service, and the second service is a called voice service, before the adjusting the steady-state transmit power of the second modem to a second maximum transmit power limit PLM2 and adjusting the steady-state transmit power of the first modem to a first low-level transmit power limit PLL1, the method further includes: configuring the first modem to use the first maximum transmit power limit PLM1 to execute the first service; and configuring the second modem to use the second low-level transmit power limit PLL2 to access the second service (optionally, an order in which the two configuration steps are performed is not limited). As shown in FIG. 4A, 1) when the first modem performs data communication by using the first maximum transmit power limit PLM1, the second modem accesses the called voice service by using the second low-level transmit power limit PLL2. 2) After the access of the second modem succeeds, the transmit power of the first modem is reduced to the first low-level transmit power limit (PowerLmtL1, PLL1 for short). 3) After the transmit power of the first modem is reduced to the first low-level transmit power limit PLL1, the transmit power of the second modem is increased to the second maximum transmit power limit PLM2, thereby ensuring communication quality of a high-priority service. 4) After either of the modems is released, power limiting on the other modem is canceled (that is, the other modem may perform transmission by using a maximum transmit power). As shown in FIG. 4A, if the second modem is released, the first modem performs communication by using the first maximum transmit power limit PLM1.

As shown in FIG. 4A, 1) for a voice access (1) process, a power control level (Power control level, PCL for short) of the first modem is detected. When the PCL level is lower than a power control level threshold (PCL_Restrict) and remains steady for a period of time that exceeds a first time limit threshold (Time_Relax), the limiting is relaxed, and the second maximum transmit power limit PLM2 is used for power limiting. After the limiting is relaxed, the PCL of the first modem is continuously detected. When the PCL level is higher than PCL_Restrict and remains steady for a period of time that exceeds a second time limit threshold (Time_Frap), the limiting is frapped, and the second low-level transmit power limit PLL2 is used for power limiting, where Time_Relax>Time_Frap. 2) For a data communication/hold (2) process, a PCL of the second modem is detected. When the PCL level is lower than PCL_Restrict and remains steady for a period of time that exceeds Time_Relax, the limiting is relaxed, and the first maximum transmit power limit PLM1 is used for power limiting. After the limiting is relaxed, the PCL of the second modem is continuously detected. When the PCL level is higher than PCL_Restrict and remains steady for a period of time that exceeds Time_Frap, the limiting is frapped, and the first low-level transmit power limit PLL1 is used for power limiting.

Optionally, as shown in FIG. 4B, if the single-pass service is the first service, the first service is a data service, the to-be-accessed service is the second service, and the second service is a calling voice service, before the adjusting the steady-state transmit power of the second modem to a second maximum transmit power limit PLM2 and adjusting the steady-state transmit power of the first modem to a first low-level transmit power limit PLL1, the method further includes: configuring the first modem to use the first maximum transmit power limit PLM1 to execute the first service; before the second modem initiates the calling voice service, reducing the transmit power of the first modem to the first low-level transmit power limit PLL1; and configuring the second modem to use the second maximum transmit power limit PLM2 to execute the calling voice service (optionally, an order in which the three steps are performed is not limited). As shown in FIG. 4B, 1) the first modem performs data communication by using the first maximum transmit power limit PLM1, and when the second modem initiates a calling voice service, the transmit power of the first modem is reduced to the first low-level transmit power limit PLL1. 2) After the transmit power of the first modem is reduced to the first low-level transmit power limit PLL1, the second modem performs access by using the second maximum transmit power limit PLM2, thereby ensuring communication quality of a high-priority service. 3) After either of the modems is released, power limiting on the other modem is canceled (that is, the other modem may perform transmission by using a maximum transmit power). As shown in FIG. 4B, if the second modem is released, the first modem performs communication by using the first maximum transmit power limit PLM1.

As shown in FIG. 4B, for a data communication/hold (1) process, a PCL of the second modem is detected. When the PCL level is lower than PCL_Restrict and remains steady for a period of time that exceeds Time_Relax, the limiting is relaxed, and the first maximum transmit power limit PLM1 is used for power limiting. After the limiting is relaxed, the PCL of the second modem is continuously detected. When the PCL level is higher than PCL_Restrict and remains steady for a period of time that exceeds Time_Frap, the limiting is frapped, and the first low-level transmit power limit PLL1 is used for power limiting.

Figure 4C:
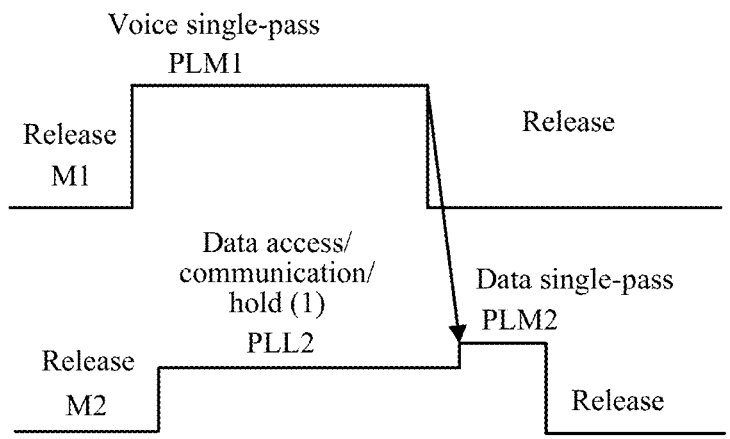
FIG. 4C is a schematic diagram 3 of power adjustment according to an embodiment of the present invention.

FIG. 4C is a schematic diagram 3 of power adjustment according to an embodiment of the present invention. As shown in FIG. 4C, if the service types of the first service and the second service include a data service and a voice service, and the service types of the first service and the second service are different (that is, in a case of concurrent execution of a data service and a voice service), step S302 includes: if the service type of the first service is a voice service and the service type of the second service is data service, determining that the priority of the first service is higher than the priority of the second service. Correspondingly, step S303 includes: adjusting the steady-state transmit power of the first modem to a first maximum transmit power limit PLM1 and adjusting the steady-state transmit power of the second modem to a second low-level transmit power limit PLL2.

As shown in FIG. 4C, if the single-pass service is the first service, the first service is a voice service, the to-be-accessed service is the second service, and the second service is a data service, before the adjusting the steady-state transmit power of the first modem to a first maximum transmit power limit PLM1 and adjusting the steady-state transmit power of the second modem to a second low-level transmit power limit PLL2, the method further includes: configuring the first modem to use the first maximum transmit power limit PLM1 to execute the first service; and configuring the second modem to use the second low-level transmit power limit PLL2 to access the second service (optionally, an order in which the two configuration steps are performed is not limited). As shown in FIG. 4C, 1) when the first modem performs data communication by using the first maximum transmit power limit PLM1, the second modem performs access by using the second low-level transmit power limit PLL2. 2) After the access of the second modem succeeds, the second modem performs data communication by always using the second low-level transmit power limit PLL2, and the first modem performs voice communication by always using the first maximum transmit power limit PLM1, thereby ensuring communication quality of a high-priority service. 3) After either of the modems is released, power limiting on the other modem is canceled (that is, the other modem may perform transmission by using a maximum transmit power). As shown in FIG. 4C, if the first modem is released, the second modem performs communication by using the second maximum transmit power limit PLM2.

As shown in FIG. 4C, for a data access/communication/ hold (1) process, a PCL of the first modem is detected. When the PCL level is lower than PCL_Restrict and remains steady for a period of time that exceeds Time_Relax, the limiting is relaxed, and the second maximum transmit power limit PLM2 is used for power limiting. After the limiting is relaxed, the PCL of the first modem is continuously detected. When the PCL level is higher than PCL_Restrict and remains steady for a period of time that exceeds Time_Frap, the limiting is frapped, and the second low-level transmit power limit PLL2 is used for power limiting.

Figure 4D:
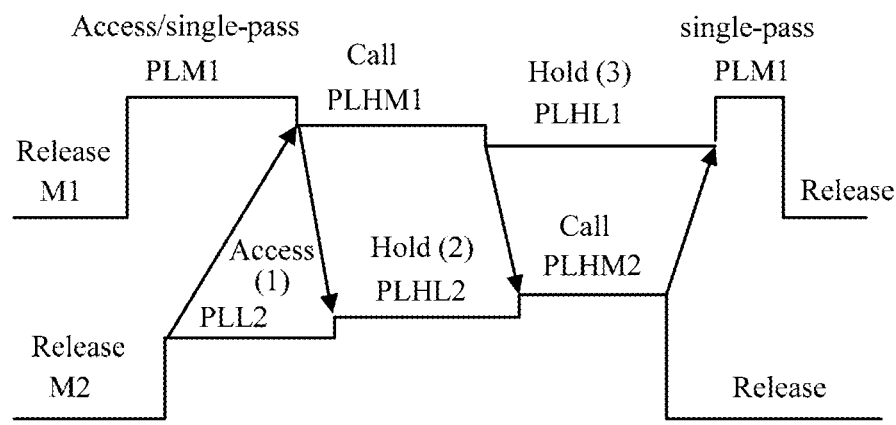
FIG. 4D is a schematic diagram 4 of power adjustment according to an embodiment of the present invention.

FIG. 4D is a schematic diagram 4 of power adjustment according to an embodiment of the present invention. As shown in FIG. 4D, if the service types of the first service and the second service include a call service and a hold service, and the service types of the first service and the second service are different (that is, when the first service and the second service are both voice services, types of the voice services further include a call service and a hold service; that is, at a particular moment, when the first service is a call service, the second service is a hold service, or at a particular moment, when the second service is a call service, the first service is a hold service), step S302 includes: if the service type of the first service is a call service and the service type of the second service is a hold service, determining that the priority of the first service is higher than the priority of the second service. Correspondingly, step S303 includes: adjusting the steady-state transmit power of the first modem to a first moderately-high-level transmit power limit (PowerLmtHM1, PLHM1 for short) and adjusting the steady-state transmit power of the second modem to a second moderately-low-level transmit power limit (PowerLmtHL2, PLHL2 for short). Further, after a call of the first modem and the second modem is switched, step S302 includes: if the service type of the first service is a hold service and the service type of the second service is a call service, determining that the priority of the second service is higher than the priority of the first service. Correspondingly, step S303 includes: adjusting the steady-state transmit power of the second modem to a second moderately-high-level transmit power limit (PowerLmtHM2, PLHM2 for short) and adjusting the steady-state transmit power of the first modem to a first moderately-low-level transmit power limit (PowerLmtHM1, PLHL1 for short).

As shown in FIG. 4D, if the single-pass service is the first service, the first service is a call service, the to-be-accessed service is the second service, and the second service is a hold service, before the adjusting the steady-state transmit power of the first modem to a first moderately-high-level transmit power limit PLHM1 and adjusting the steady-state transmit power of the second modem to a second moderately-low-level transmit power limit PLHL2, the method further includes: configuring the first modem to use the first maximum transmit power limit PLM1 to execute the first service; and configuring the second modem to use the second low-level transmit power limit PLL2 to access the second service (optionally, an order in which the two configuration steps are performed is not limited).

As shown in FIG. 4D, 1) when the first modem makes a call by using the first maximum transmit power limit PLM1, the second modem performs access by using the second low-level transmit power limit PLL2. 2) After the access of the second modem succeeds, the transmit power of the first modem is reduced to the first moderately-high-level transmit power limit PLHM1. 3) After the transmit power of the first modem is reduced to the first moderately-high-level transmit power limit PLHM1, the transmit power of the second modem is increased to the second moderately-low-level transmit power limit PLHL2 to execute the hold service, where the first moderately-high-level transmit power limit PLHM1 is greater than or equal to the second moderately-low-level transmit power limit PLHL2, thereby ensuring communication quality of a high-priority service. 4) After a call of the first modem and the second modem is switched (that is, the service type of the first service is a hold service, and the service type of the second service is a call service), it is determined that the priority of the second service is higher than the priority of the first service, the transmit power of the first modem is reduced to a first moderately-low-level transmit power limit PLHL1 to execute the hold service, and the transmit power of the second modem is increased to a second moderately-high-level transmit power limit PLHM2 to execute the call service, where the second moderately-high-level transmit power limit PLHM2 is greater than or equal to the first moderately-low-level transmit power limit PLHL1, thereby ensuring communication quality of a high-priority service. 5) After either of the modems is released, power limiting on the other modem is canceled (that is, the other modem may perform transmission by using a maximum transmit power). As shown in FIG. 4D, if the second modem is released, the first modem performs communication by using the first maximum transmit power limit PLM1.

As shown in FIG. 4D, 1) for an access (1) process, a PCL of the first modem is detected. When the PCL level is lower than PCL_Restrict and remains steady for a period of time that exceeds Time_Relax, the second moderately-high-level transmit power limit PLHM2 is used for power limiting. After the limiting is relaxed, the PCL of the first modem is continuously detected. When the PCL level is higher than PCL_Restrict and remains steady for a period of time that exceeds Time_Frap, the limiting is frapped, and the second low-level transmit power limit PLL2 is used for power limiting, where Time_Relax>Time_Frap. 2) For a hold (2) process, the PCL of the first modem is detected. When the PCL level is lower than PCL_Restrict and remains steady for a period of time that exceeds Time_Relax, the limiting is relaxed, and the second moderately-high-level transmit power limit PLHM2 is used for power limiting. After the limiting is relaxed, the PCL of the first modem is continuously detected. When the PCL level is higher than PCL_Restrict and remains steady for a period of time that exceeds Time_Frap, the limiting is frapped, and the second moderately-low-level transmit power limit PLHL2 is used for power limiting. 3) For a hold (3) process, the PCL of the second modem is detected. When the PCL level is lower than PCL_Restrict and remains steady for a period of time that exceeds Time_Relax, the limiting is relaxed, and the first moderately-high-level transmit power limit PLHM1 is used for power limiting. After the limiting is relaxed, the PCL of the second modem is continuously detected. When the PCL level is higher than PCL_Restrict and remains steady for a period of time that exceeds Time_Frap, the limiting is frapped, and the first moderately-low-level transmit power limit PLHL1 is used for power limiting. As can be seen, in this embodiment of the present invention, a PCL of a modem is detected in real time, and a limiting policy is adjusted dynamically, so that a TRP of a communications terminal and a coverage area of a base station can be increased.

Based on the above, in this embodiments of the present invention, steady-state transmit powers of modems are adjusted according to a service type of the first service and a service type of the second service, where the modems include the first modem and the second modem, so that a steady-state transmit power of a modem corresponding to a high-priority service in the first service and the second service is greater than or equal to a steady-state transmit power of a modem corresponding to a low-priority service in the first service and the second service. Therefore, communication quality of a high-priority service is ensured.

Figure 4E:
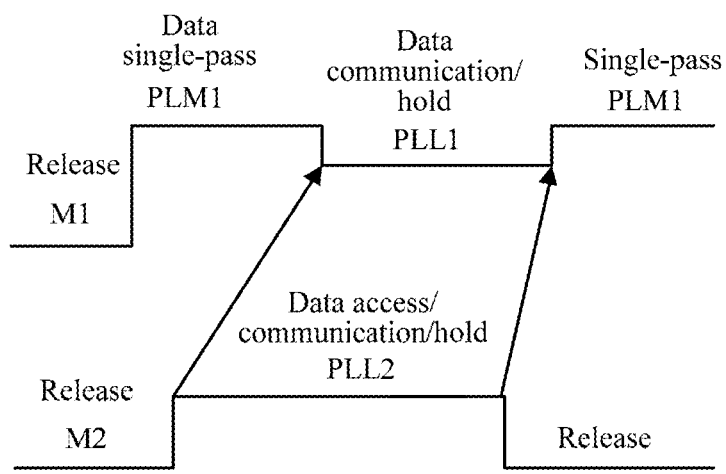
FIG. 4E is a schematic diagram 5 of power adjustment according to an embodiment of the present invention.

Further, in this embodiment of the present invention, the first service and the second service may both be data services, and a specific process is as follows:

FIG. 4E is a schematic diagram 5 of power adjustment according to an embodiment of the present invention. As shown in FIG. 4E, 1) when the first modem performs data communication by using the first maximum transmit power limit PLM1, the second modem performs access by using the second low-level transmit power limit PLL2. 2) After the access of the second modem succeeds, the transmit power of the first modem is also reduced to a first low-level transmit power limit PLL1 for data communication. 3) After either of the modems is released, power limiting on the other modem is canceled (that is, the other modem may perform transmission by using a maximum transmit power). As shown in FIG. 4E, if the second modem is released, the first modem performs communication by using the first maximum transmit power limit PLM1.

Further, the method for adjusting a transmit power in GSM that is provided by this embodiment of the present invention further includes:

detecting an electric quantity status of the communications terminal; and if determining that a remaining electric quantity of the communications terminal is less than a low electric quantity threshold, reducing each transmit power limit by a preset numerical value, where the transmit power limit includes at least one of the following: the first low-level transmit power limit PLL1, the first moderately-low-level transmit power limit PLHL1, the first moderately-high-level transmit power limit PLHM1, the first maximum transmit power limit PLM1, the second low-level transmit power limit PLL2, the second moderately-low-level transmit power limit PLHL2, the second moderately-high-level transmit power limit PLHM2, or the second maximum transmit power limit PLM2.

In this embodiment of the present invention, a low electric quantity non-volatile memory (Non-volatile memory, NV for short) interface is further provided to detect the electric quantity status of the communications terminal, and if it is determined that the remaining electric quantity of the communications terminal is less than the low electric quantity threshold, a stricter power limiting condition is used, that is, a numerical value of each transmit power limit is reduced by a preset numerical value (for example, any parameter or a combination of the PLL1, the PLHL1, the PLHM1, the PLM1, the PLL2, the PLHL2, the PLHM2, the PLM2, or the like). Optionally, the parameters PCL_Restrict, Time_Relax, and Time_Frap may remain unchanged.

Optionally, in the foregoing embodiments of the present invention, the PLL1 is less than or equal to the PLHL1, the PLHL1 is less than or equal to the PLHM1, the PLHM1 is less than or equal to the PLM1, the PLL2 is less than or equal to the PLHL2, the PLHL2 is less than or equal to the PLHM2, and the PLHM2 is less than or equal to the PLM2.

Figure 5:
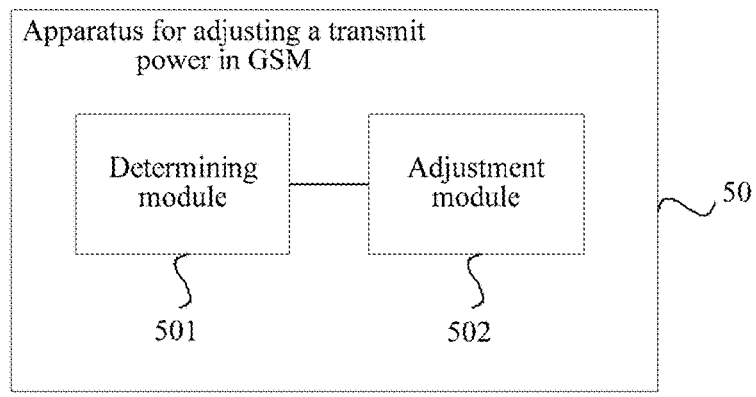
FIG. 5 is a schematic structural diagram of Embodiment 1 of an apparatus for adjusting a transmit power in GSM according to the present invention.

FIG. 5 is a schematic structural diagram of Embodiment 1 of an apparatus for adjusting a transmit power in GSM according to the present invention. As shown in FIG. 5, an apparatus 50 for adjusting a transmit power in GSM that is provided by this embodiment may include a determining module 501 and an adjustment module 502.

The determining module 501 is configured to determine that a communications terminal concurrently executes services respectively on a first subscriber identity module SIM card and a second SIM card that are supported by the communications terminal, where the service executed on the first SIM card is a first service, the service executed on the second SIM card is a second service, a modem corresponding to the first SIM card is a first modem, and a modem corresponding to the second SIM card is a second modem.

The adjustment module 502 is configured to adjust steady-state transmit powers of modems according to a service type of the first service and a service type of the second service, where the modems include the first modem and the second modem, so that a steady-state transmit power of a modem corresponding to a high-priority service in the first service and the second service is greater than or equal to a steady-state transmit power of a modem corresponding to a low-priority service in the first service and the second service. The steady-state transmit power refers to a transmit power of a to-be-accessed service or a single-pass service within a period of time starting from successful access of the to-be-accessed service to the single-pass service to releasing of either of the services; and the to-be-accessed service is the first service or the second service, and correspondingly, the single-pass service is a service, other than the to-be-accessed service, in the first service and the second service.

Optionally, the adjustment module includes:

a determining unit, configured to determine priorities of the first service and the second service according to the service type of the first service and the service type of the second service; and a first adjustment unit, configured to adjust the steady-state transmit power of the modem corresponding to the high-priority service in the first service and the second service to be greater than or equal to the steady-state transmit power of the modem corresponding to the low-priority service in the first service and the second service.

Optionally, if the service types of the first service and the second service include a data service and a voice service, and the service types of the first service and the second service are different, the determining unit is specifically configured to:

if the service type of the first service is a data service and the service type of the second service is a voice service, determine that the priority of the second service is higher than the priority of the first service; and correspondingly, the first adjustment unit is specifically configured to:

adjust the steady-state transmit power of the second modem to a second maximum transmit power limit PLM2 and adjust the steady-state transmit power of the first modem to a first low-level transmit power limit PLL1; or the determining unit is specifically configured to:

if the service type of the first service is a voice service and the service type of the second service is a data service, determine that the priority of the first service is higher than the priority of the second service; and correspondingly, the first adjustment unit is specifically configured to:

adjust the steady-state transmit power of the first modem to a first maximum transmit power limit PLM1 and adjust the steady-state transmit power of the second modem to a second low-level transmit power limit PLL2.

Optionally, if the service types of the first service and the second service include a call service and a hold service, and the service types of the first service and the second service are different, the determining unit is specifically configured to:

if the service type of the first service is a call service and the service type of the second service is a hold service, determine that the priority of the first service is higher than the priority of the second service; and correspondingly, the first adjustment unit is specifically configured to:

adjust the steady-state transmit power of the first modem to a first moderately-high-level transmit power limit PLHM1 and adjust the steady-state transmit power of the second modem to a second moderately-low-level transmit power limit PLHL2; or the determining unit is specifically configured to:

if the service type of the first service is a hold service and the service type of the second service is a call service, determine that the priority of the second service is higher than the priority of the first service; and correspondingly, the first adjustment unit is specifically configured to:

adjust the steady-state transmit power of the second modem to a second moderately-high-level transmit power limit PLHM2 and adjust the steady-state transmit power of the first modem to a first moderately-low-level transmit power limit PLHL1.

Optionally, if the single-pass service is the first service, the first service is a data service, the to-be-accessed service is the second service, and the second service is a called voice service, the adjustment module further includes a first configuration unit, and the first configuration unit is configured to:

configure the first modem to use the first maximum transmit power limit PLM1 to execute the first service; and configure the second modem to use the second low-level transmit power limit PLL2 to access the second service.

Optionally, if the single-pass service is the first service, the first service is a data service, the to-be-accessed service is the second service, and the second service is a calling voice service, the adjustment module further includes a second configuration unit, and the second configuration unit is configured to:

configure the first modem to use the first maximum transmit power limit PLM1 to execute the first service;

before the second modem initiates the calling voice service, reduce the transmit power of the first modem to the first low-level transmit power limit PLL1; and configure the second modem to use the second maximum transmit power limit PLM2 to execute the calling voice service.

Optionally, if the single-pass service is the first service, the first service is a data service, the to-be-accessed service is the second service, and the second service is a data service, the adjustment module further includes a third configuration unit, and the third configuration unit is configured to:

configure the first modem to use the first maximum transmit power limit PLM1 to execute the first service; and configure the second modem to use the second low-level transmit power limit PLL2 to access the second service.

Optionally, if the single-pass service is the first service, the first service is a call service, the to-be-accessed service is the second service, and the second service is a hold service, the adjustment module further includes a fourth configuration unit, and the fourth configuration unit is configured to:

configure the first modem to use the first maximum transmit power limit PLM1 to execute the first service; and configure the second modem to use the second low-level transmit power limit PLL2 to access the second service.

Optionally, the adjustment module further includes a second adjustment unit, and the second adjustment unit is configured to:

if the first modem stops executing the first service, adjust the steady-state transmit power of the second modem to the second maximum transmit power limit PLM2; or if the second modem stops executing the second service, adjust the steady-state transmit power of the first modem to the first maximum transmit power limit PLM1.

Optionally, the apparatus further includes an electric quantity detection module, and the electric quantity detection module is configured to:

detect an electric quantity status of the communications terminal; and if determining that a remaining electric quantity of the communications terminal is less than a low electric quantity threshold, reduce each transmit power limit by a preset numerical value, where the transmit power limit includes at least one of the following: the first low-level transmit power limit PLL1, the first moderately-low-level transmit power limit PLHL1, the first moderately-high-level transmit power limit PLHM1, the first maximum transmit power limit PLM1, the second low-level transmit power limit PLL2, the second moderately-low-level transmit power limit PLHL2, the second moderately-high-level transmit power limit PLHM2, or the second maximum transmit power limit PLM2.

The apparatus for adjusting a transmit power in GSM according to this embodiment may be configured to execute the technical solutions in the foregoing embodiments of the method for adjusting a transmit power in GSM according to the present invention. Their implementation principles and technical effects are similar. Details are not described herein again.

Figure 6:
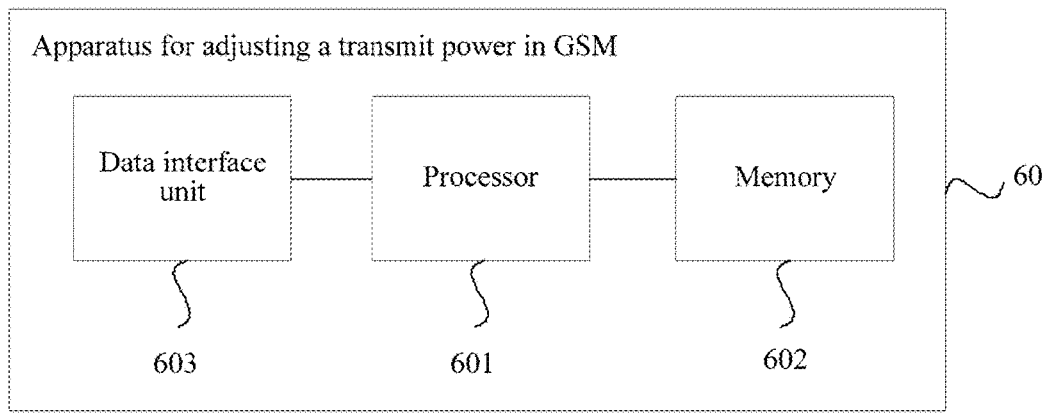
FIG. 6 is a schematic structural diagram of Embodiment 2 of an apparatus for adjusting a transmit power in GSM according to the present invention.

FIG. 6 is a schematic structural diagram of Embodiment 2 of an apparatus for adjusting a transmit power in GSM according to the present invention. As shown in FIG. 6, an apparatus 60 for adjusting a transmit power in GSM that is provided by this embodiment may include a processor 601 and a memory 602. The apparatus 60 for adjusting a transmit power in GSM may further include a data interface unit 603, and the data interface unit 603 may be connected to the processor 601. The data interface unit 603 is configured to receive/send service data, and the memory 602 is configured to store an executable instruction. When the apparatus 60 for adjusting a transmit power in GSM runs, the processor 601 and the memory 602 communicate with each other, and the processor 601 invokes the executable instruction in the memory 602 to perform the operations in the foregoing embodiments of the method for adjusting a transmit power in GSM.

The apparatus for adjusting a transmit power in GSM according to this embodiment may be configured to execute the technical solutions in the foregoing embodiments of the method for adjusting a transmit power in GSM according to the present invention. Their implementation principles and technical effects are similar. Details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for adjusting a transmit power in a Global System for Mobile Communications (GSM) communications terminal, the method comprising:
   determining that a GSM communications terminal concurrently executes a first service on a first subscriber identity module (SIM) card and a second service on a second SIM card that are supported by the communications terminal, wherein a modem corresponding to the first SIM card is a first modem, and a modem corresponding to the second SIM card is a second modem;
   adjusting steady-state transmit powers of the first modem according to a service type of the first service and the second modem according to a service type of the second service, so that a steady-state transmit power of a modem corresponding to a high-priority service in the first service and the second service is greater than or equal to a steady-state transmit power of a modem corresponding to a low-priority service in the first service and the second service, wherein the steady-state transmit power refers to a transmit power of a to-be-accessed service or a single-pass service within a period of time starting from successful access of the to-be-accessed service during execution of the single-pass service to releasing of either of the services; and the to-be-accessed service is the first service or the second service, and correspondingly, the single-pass service is a service, other than the to-be-accessed service, in the first service and the second service; and
   wherein adjusting steady-state transmit powers of the first modem according to a service type of the first service and the second modem according to a service type of the second service, comprises:
      determining priorities of the first service and the second service according to the service type of the first service and the service type of the second service, and
      adjusting the steady-state transmit power of the modem corresponding to the high-priority service in the first service and the second service to be greater than or equal to the steady-state transmit power of the modem corresponding to the low-priority service in the first service and the second service.

2. The method according to claim 1, wherein:
   determining priorities of the first service and the second service according to the service type of the first service and the service type of the second service comprises:
      when the service type of the first service is a data service and the service type of the second service is a voice service, determining that the priority of the second service is higher than the priority of the first service; and
   correspondingly, adjusting the steady-state transmit power of the modem corresponding to the high-priority service in the first service and the second service to be greater than or equal to the steady-state transmit power of the modem corresponding to the low-priority service in the first service and the second service comprises:
      adjusting the steady-state transmit power of the second modem to a second maximum transmit power limit (PLM2) and adjusting the steady-state transmit power of the first modem to a first low-level transmit power limit (PLL1).

3. The method according to claim 2, wherein:
   when the single-pass service is the first service, the first service is a data service, the to-be-accessed service is the second service, and the second service is a called voice service, before adjusting the steady-state transmit power of the second modem to the PLM2 and adjusting the steady-state transmit power of the first modem to the PLL1, the method further comprises:
   configuring the first modem to use a first maximum transmit power limit (PLM1) to execute the first service; and
   configuring the second modem to use a second low-level transmit power limit (PLL2) to access the second service.

4. The method according to claim 2, wherein:
   when the single-pass service is the first service, the first service is a data service, the to-be-accessed service is the second service, and the second service is a calling voice service, before adjusting the steady-state transmit power of the second modem to the PLM2 and adjusting the steady-state transmit power of the first modem to the PLL1, the method further comprises:
   configuring the first modem to use a first maximum transmit power limit (PLM1) to execute the first service;
   before the second modem initiates the calling voice service, reducing the transmit power of the first modem to the PLL1; and
   configuring the second modem to use the PLM2 to execute the calling voice service.

5. The method according to claim 1, wherein:
   determining priorities of the first service and the second service according to the service type of the first service and the service type of the second service comprises:
      when the service type of the first service is a voice service and the service type of the second service is a data service, determining that the priority of the first service is higher than the priority of the second service; and
   correspondingly, adjusting the steady-state transmit power of the modem corresponding to the high-priority service in the first service and the second service to be greater than or equal to the steady-state transmit power of the modem corresponding to the low-priority service in the first service and the second service comprises:
      adjusting the steady-state transmit power of the first modem to a first maximum transmit power limit (PLM1) and adjusting the steady-state transmit power of the second modem to a second low-level transmit power limit (PLL2).

6. The method according to claim 5, wherein when the single-pass service is the first service, the first service is a voice service, the to-be-accessed service is the second service, and the second service is a data service, before adjusting the steady-state transmit power of the first modem to the PLM1 and adjusting the steady-state transmit power of the second modem to the PLL2, the method further comprises:
  configuring the first modem to use a first maximum transmit power limit (PLM1) to execute the first service; and
  configuring the second modem to use a second low-level transmit power limit (PLL2) to access the second service.

7. The method according to claim 1, wherein:
  determining priorities of the first service and the second service according to the service type of the first service and the service type of the second service comprises:
    when the service type of the first service is a call service and the service type of the second service is a hold service, determining that the priority of the first service is higher than the priority of the second service; and
  correspondingly, adjusting the steady-state transmit power of the modem corresponding to the high-priority service in the first service and the second service to be greater than or equal to the steady-state transmit power of the modem corresponding to the low-priority service in the first service and the second service comprises:
    adjusting the steady-state transmit power of the first modem to a first moderately-high-level transmit power limit (PLHM1) and adjusting the steady-state transmit power of the second modem to a second moderately-low-level transmit power limit (PLHL2).

8. The method according to claim 7, wherein when the single-pass service is the first service, the first service is a call service, the to-be-accessed service is the second service, and the second service is a hold service, before adjusting the steady-state transmit power of the first modem to the PLHM1 and adjusting the steady-state transmit power of the second modem to the PLHL2, the method further comprises:
  configuring the first modem to use a first maximum transmit power limit (PLM1) to execute the first service; and
  configuring the second modem to use a second low-level transmit power limit (PLL2) to access the second service.

9. The method according to claim 1, wherein:
  determining priorities of the first service and the second service according to the service type of the first service and the service type of the second service comprises:
    when the service type of the first service is a hold service and the service type of the second service is a call service, determining that the priority of the second service is higher than the priority of the first service; and
  correspondingly, adjusting the steady-state transmit power of the modem corresponding to the high-priority service in the first service and the second service to be greater than or equal to the steady-state transmit power of the modem corresponding to the low-priority service in the first service and the second service comprises:
    adjusting the steady-state transmit power of the second modem to a second moderately-high-level transmit power limit (PLHM2) and adjusting the steady-state transmit power of the first modem to a first moderately-low-level transmit power limit (PLHL 1).

10. The method according to claim 1, wherein after adjusting the steady-state transmit power of the modem corresponding to the high-priority service in the first service and the second service to be greater than or equal to the steady-state transmit power of the modem corresponding to the low-priority service in the first service and the second service, the method further comprises:
  when the first modem stops executing the first service, adjusting the steady-state transmit power of the second modem to a second maximum transmit power limit (PLM2); or
  when the second modem stops executing the second service, adjusting the steady-state transmit power of the first modem to a first maximum transmit power limit (PLM1).

11. A method for adjusting a transmit power in a Global System for Mobile Communications (GSM) communications terminal, the method comprising:
  determining that a GSM communications terminal concurrently executes a first service on a first subscriber identity module (SIM) card and a second service on a second SIM card that are supported by the communications terminal, wherein a modem corresponding to the first SIM card is a first modem, and a modem corresponding to the second SIM card is a second modem;
  adjusting steady-state transmit powers of the first modem according to a service type of the first service and the second modem according to a service type of the second service, so that a steady-state transmit power of a modem corresponding to a high-priority service in the first service and the second service is greater than or equal to a steady-state transmit power of a modem corresponding to a low-priority service in the first service and the second service, wherein the steady-state transmit power refers to a transmit power of a to-be-accessed service or a single-pass service within a period of time starting from successful access of the to-be-accessed service during execution of the single-pass service to releasing of either of the services; and the to-be-accessed service is the first service or the second service, and correspondingly, the single-pass service is a service, other than the to-be-accessed service, in the first service and the second service;
  detecting an electric quantity status of the communications terminal; and
  when determining that a remaining electric quantity of the communications terminal is less than a low electric quantity threshold, reducing each transmit power limit by a preset numerical value, wherein the transmit power limit comprises at least one of the following: a first low-level transmit power limit (PLL1), a first moderately-low-level transmit power limit (PLHL1), a first moderately-high-level transmit power limit (PLHM1), a first maximum transmit power limit (PLM1), a second low-level transmit power limit (PLL2), a second moderately-low-level transmit power limit (PLHL2), a second moderately-high-level transmit power limit (PLHM2), or a second maximum transmit power limit (PLM2).

12. An apparatus for adjusting a transmit power in Global System for Mobile Communications (GSM) communications terminal, the apparatus comprising:
  a memory storing instructions; and
  a processor coupled to the memory which, when executing the instructions, causes the apparatus to:
    determine that a GSM communications terminal concurrently executes a first service on a first subscriber identity module (SIM) card and a second service on a second SIM card that are supported by the GSM communications terminal, wherein a modem corresponding to the first SIM card is a first modem, and a modem corresponding to the second SIM card is a second modem, adjust steady-state transmit powers of the first modem according to a service type of the first service and the second modem according to a service type of the second service, wherein the modems comprise the first modem and the second modem, so that a steady-state transmit power of a modem corresponding to a high-priority service in the first service and the second service is greater than or equal to a steady-state transmit power of a modem corresponding to a low-priority service in the first service and the second service, wherein the steady-state transmit power refers to a transmit power of a to-be-accessed service or a single-pass service within a period of time starting from successful access of the to-be-accessed service during execution of the single-pass service to releasing of either of the services; and the to-be-accessed service is the first service or the second service, and correspondingly, the single-pass service is a service, other than the to-be-accessed service, in the first service and the second service, determine priorities of the first service and the second service according to the service type of the first service and the service type of the second service, and adjust the steady-state transmit power of the modem corresponding to the high-priority service in the first service and the second service to be greater than or equal to the steady-state transmit power of the modem corresponding to the low-priority service in the first service and the second service.

13. The apparatus according to claim 12, wherein when the service type of the first service is a data service and the service type of the second service is a voice service, the processor is further configured to:

determine that the priority of the second service is higher than the priority of the first service; and adjust the steady-state transmit power of the second modem to a second maximum transmit power limit (PLM2) and adjust the steady-state transmit power of the first modem to a first low-level transmit power limit (PLL1).

14. The apparatus according to claim 13, wherein the single-pass service is the first service, the first service is a data service, the to-be-accessed service is the second service, and the second service is a called voice service, the processor is further configured to:

configure the first modem to use the PLM1 to execute the first service; and configure the second modem to use the PLL2 to access the second service.

15. The apparatus according to claim 13, wherein when the single-pass service is the first service, the first service is a data service, the to-be-accessed service is the second service, and the second service is a calling voice service, the processor is further configured to:

configure the first modem to use the PLM1 to execute the first service;

reduce the transmit power of the first modem to the PLL1 before the second modem initiates the calling voice service; and configure the second modem to use a second maximum transmit power limit (PLM2) to execute the calling voice service.

16. The apparatus according to claim 12, wherein when the service type of the first service is a voice service and the service type of the second service is a data service, the processor is further configured to:

determine that the priority of the first service is higher than the priority of the second service; and adjust the steady-state transmit power of the first modem to a first maximum transmit power limit (PLM1) and adjust the steady-state transmit power of the second modem to a second low-level transmit power limit (PLL2).

17. The apparatus according to claim 12, wherein when the service type of the first service is a call service and the service type of the second service is a hold service, the processor is further configured to:

determine that the priority of the first service is higher than the priority of the second service; and adjust the steady-state transmit power of the first modem to a first moderately-high-level transmit power limit (PLHM1) and adjust the steady-state transmit power of the second modem to a second moderately-low-level transmit power limit (PLHL2).

18. The apparatus according to claim 12, wherein the service type of the first service is a hold service and the service type of the second service is a call service, the processor is further configured to:

determine that the priority of the second service is higher than the priority of the first service; and adjust the steady-state transmit power of the second modem to a second moderately-high-level transmit power limit (PLHM2) and adjust the steady-state transmit power of the first modem to a first moderately-low-level transmit power limit (PLHL1).

* * * * *